Figure 1:
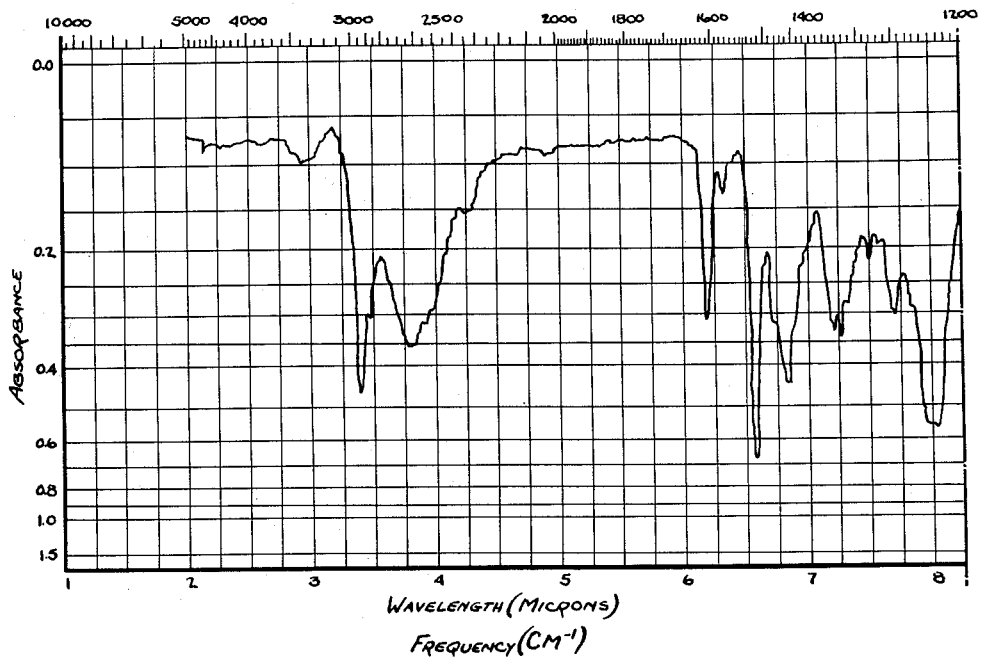
Figure 1:
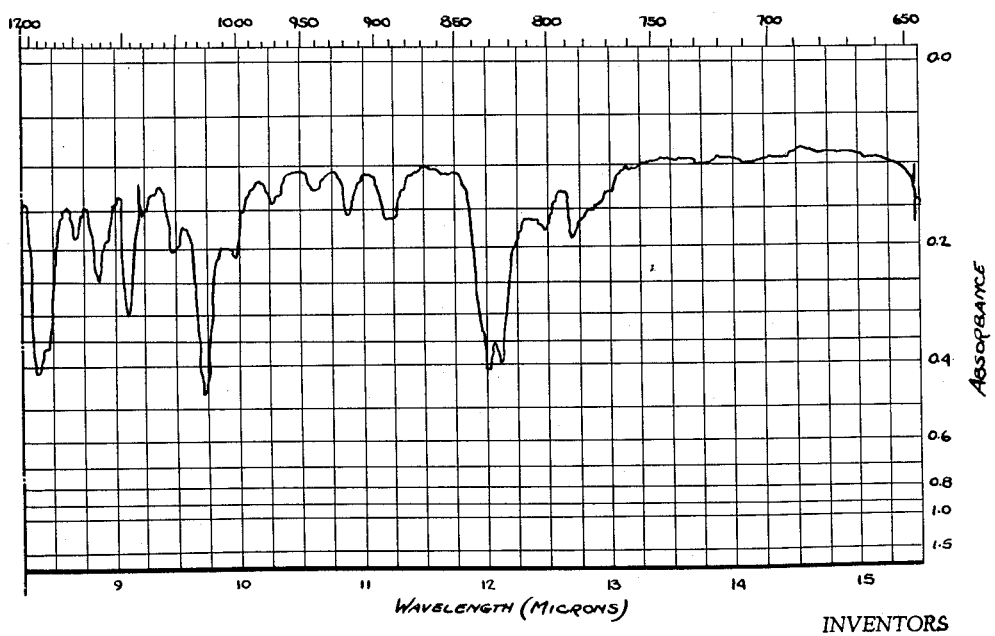

INVENTORS
ALFRED POPELAK
GUSTAV LETTENBAUER

AGENT

INVENTORS
ALFRED POPELAK
GUSTAV LETTENBAUER

United States Patent Office 3,028,394
Patented Apr. 3, 1962

3,028,394
9-PHENYL OCTAHYDROINDOLE COMPOUNDS AND PROCESS OF MAKING SAME
Alfred Popelak, Mannheim, and Gustav Lettenbauer, Lampertheim, Hessen, Germany, assignors to C. F. Boehringer & Soehne G.m.b.H., Mannheim-Waldhof, Germany, a corporation of Germany
Filed Mar. 27, 1961, Ser. No. 98,477
Claims priority, application Germany Mar. 28, 1960
5 Claims. (Cl. 260—319)

The present invention relates to valuable octahydroindole compounds, and more particularly to 9-phenyl octahydroindole compounds, and to a process of making same.

It is one object of the present invention to provide valuable 9-phenyl octahydroindole compounds of surprisingly low toxicity, excellent tolerability, and interesting psychotropic properties which permit their therapeutic administration especially as ataractic agents.

Another object of the present invention is to provide a simple and effective process of producing such valuable 9-phenyl octahydroindole compounds.

A further object of the present invention is to provide a process of producing ataraxia in humans and animals by administering the 9-phenyl octahydroindole compounds according to the present invention.

A further object of the present invention is to provide 9-phenyl hexahydroindole compounds which are useful as intermediates in the preparation of said 9-phenyl octahydroindole compounds.

Another object of the present invention is to provide a process of producing such 9-phenyl hexahydroindole compounds.

Other objects of the present invention and advantageous features thereof will become apparent as the description proceeds.

In principle, the 9-phenyl octahydroindole compounds according to the present invention correspond to the following Formula I:

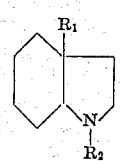

(I)

In said formula $R_1$ indicates the phenyl radical which may be substituted by one or more halogen atoms, alkyl radicals, hydroxyl groups, or alkoxy groups, and especially by lower alkyl radicals and lower alkoxy groups, while
$R_2$ indicates an alkyl or an aralkyl radical, and especially a lower alkyl radical or a phenyl lower alkyl radical.

As stated above, these compounds are surprisingly well tolerated and possess interesting psychotropic activity which permits their therapeutic use especially as agents causing ataraxia.

The new 9-phenyl octahydroindole compounds of Formula I can be prepared, for instance, by alkylation or, respectively, aralkylation of 9-phenyl octahydroindole compounds of the Formula II

(II)

wherein $R_1$ represents the same substituents as indicated above.

Another process of producing the new 9-phenyl octahydroindole compounds according to the present invention consists in reacting 9-phenyl-2,3,4,5,6,7-hexahydroindole compounds of Formula III

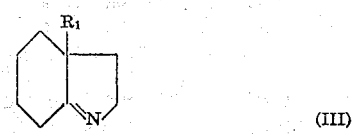

(III)

wherein $R_1$ represents the same substituent as indicated above, with alkylating or, respectively, aralkylating agents and hydrogenating the resulting reaction products.

The starting materials useful for producing the compounds of Formulas II or, respectively, III, can be prepared, for instance, by proceeding according to Bachmann and Fornefeld "J. Am. Chem. Soc.," vol. 73, p. 51 (1951), or, respectively, according to Wildman "J. Am. Chem. Soc.," vol. 80, page 2567 (1958). According to Bachmann and Fornefeld, the cyclic amine 9-phenyl-$\Delta^7$-hexahydroindole is obtained by subjecting 2-oxo-1-phenyl cyclohexane propionic acid to the Curtius reaction via the hydrazone hydrazide and hydrolyzing and rearranged azide in acid solution. Hydrogenation of the resulting hexahydroindole compound yields the corresponding octahydroindole compound.

Alkylation or, respectively, aralkylation according to the present invention is effected, for instance, by means of alkyl- or, respectively, aralkyl-active compounds, by reaction with aldehydes and subsequent hydrogenation in the presence of formic acid, or by acylation and subsequent reduction of the acyl group by means of complex metal hydrides, such as lithium aluminum hydride. The reduction of the double bond in the hexahydroindole compounds is effected, for instance, by catalytic hydrogenation.

The 1-methyl-9-(3,4-dimethoxy phenyl) octahydroindole of Formula IV

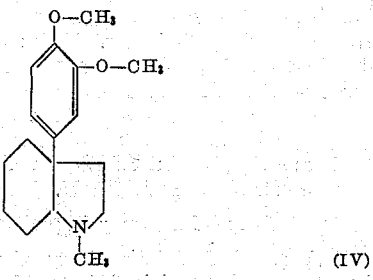

(IV)

may also be obtained from the natural alkaloids mesembrine and mesembrenine, which are the main alkaloids found in the plant *Mesembryanthemum tortuosum* L. These known alkaloids have the following structures:

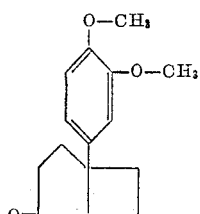

Mesembrine (V)

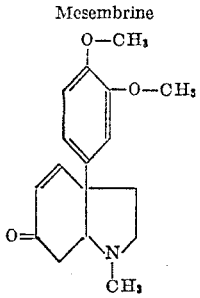

Mesembrenine (VI)

The conversion of said alkaloids into the compound of Formula IV, which will be called hereinafter "mesembrane," is effected, for instance, by the following methods:

(a) Treatment of mesembrine with agents which are capable of converting a keto group into a methylene group, for instance, according to the methods of Wolf-Kishner or Clemmensen;

(b) Treatment of mesembrenine with agents which are capable of converting a keto group into a methylene group, for instance, according to the methods of Wolf-Kishner or Clemmensen, either preceded or followed by hydrogenation;

(c) Conversion of mesembrine into the corresponding secondary alcohol, reacting said alcohol with agents which cause splitting off of water, and hydrogenation of the resulting product. It may be mentioned that the structures of mesembrine and mesembrenine have, for the first time, been determined by the present inventors.

The 9-phenyl octahydroindole compounds of Formula I are obtained in two cis-trans isomeric compounds depending upon the linkage of the two rings of the octahydroindole moiety of the molecule. Said two isomeric compounds can be resolved into their optical components by methods as they are known in the art for resolving racemic mixtures.

The following examples serve to illustrate the present invention without, however, limiting the same thereto.

EXAMPLE 1

(a) 5-(3,4-Dimethoxy Phenyl-4-Nitro Cyclohexene

A solution of 50 g. of 1-(3,4-dimethoxy phenyl)-2-nitro ethylene, 1 g. of hydroquinone, and 115 cc. of butadiene in 215 cc. of toluene is heated in an autoclave to 120–130° C. for 3 days. After distilling off excess butadiene and the toluene, the residue is recrystallized from acetic acid ethyl ester. Yield: 45.5 g. Pure 5-(3,4-dimethoxy phenyl)-4-nitro cyclohexene of the melting point of 116° C. is obtained by further recrystallization from ethanol or di-isopropyl ether.

*Analysis.*—$C_{14}H_{17}NO_4$: Molecular weight, 263.3. Calculated: 63.86% C; 6.51% H; 5.32% N. Found: 63.57% C; 6.44% H; 5.46% N.

(b) 2-(3,4-Dimethoxy Phenyl) Cyclohexanone 11.9 g. of 5-(3,4-dimethoxy phenyl)-4-nitro cyclohexene are dissolved in 300 cc. of 96% ethanol. The solution is added to a solution of 2.55 g. of metallic sodium in 76.5 cc. of ethanol while under nitrogen. After allowing the reaction mixture to stand for one hour, the solution is added drop by drop under nitrogen and with vigorous stirring into a mixture of 61.2 cc. of concentrated hydrochloric acid, 204 cc. of water, 153 cc. of ethanol, and 0.5 g. of urea which mixture had previously been cooled to —5° C. The speed of addition is such that a temperature of 0° C. is not exceeded. After the addition has been completed, the reaction mixture is stirred at 0° C. for one hour and at room temperature for 30 minutes. The reaction solution is poured into 3.5 l. of ice-cooled 10% sodium chloride solution and the 5-(3,4-dimethoxy phenyl) cyclohexene-(1)-one-(4) is exhaustively extracted by means of ether. The ethereal solution is washed with a sodium bicarbonate solution, dried, and evaporated to dryness by distillation in a vacuum. The distillation residue of 11.54 g. is immediately dissolved in methanol and is hydrogenated with the addition of palladium catalyst deposited on barium sulfate. After the calculated amount of hydrogen has been absorbed, the catalyst is filtered off and the solvent is removed by distillation. On recrystallization from di-isopropyl ether, 7.07 g. of 2-(3,4-dimethoxy phenyl) cyclohexanone of the melting point 68–70° C. are obtained.

*Analysis.*—$C_{14}H_{18}O_3$: Molecular weight, 234.3. Calculated: 71.77% C; 7.74% H. Found: 71.63% C; 7.84% H.

(c) 2-(β-Cyanoethyl)-2-(3,4-Dimethoxy Phenyl) Cyclohexanone 6.0 g. of acrylonitrile in 30 cc. of dioxane are added to a solution of 20.4 g. of 2-(3,4-dimethyl phenyl) cyclohexanone in 150 cc. of dioxane after 10 cc. of an methanolic "Triton B" solution containing 30% of trimethyl benzyl ammonium hydroxide have been added, while stirring. Reaction takes place whereby the temperature increases and the solution attains a dark color. After heating to 70° C. for one and a half hours, the mixture is allowed to stand at room temperature overnight. After dilution with water and acidification with dilute hydrochloric acid, the reaction mixture is extracted with ether. The ether extracts are washed with water, dried over anhydrous sodium sulfate, and evaporated to dryness by distillation in a vacuum. The residue is purified by passing a benzene solution through chromatographic aluminum oxide. The resulting 2-(β-cyano ethyl)-2-(3,4-dimethoxy phenyl) cyclohexanone is an almost colorless oil of the boiling point 180° C./0.05 mm. Hg.

*Analysis.*—$C_{17}H_{21}O_3N$: Molecular weight, 287.4. Calculated: 71.05% C; 7.37% H; 4.87% N. Found: 70.85% C; 7.62% H; 4.98% N.

(d) 2-(β-Carbomethoxy Ethyl)-2-(3,4-Dimethyl Phenyl) Cyclohexanone 9.6 g. of 2-(β-cyano ethyl)-2-(3,4-dimethoxy phenyl) cyclohexanone are dissolved in 400 cc. of methanol. The solution is saturated with hydrogen chloride and is then heated under reflux for 12 hours. Thereafter it is concentrated by evaporation to about one third of its volume. The residue is diluted with ice water and is neutralized by the addition of sodium bicarbonate. The neutralized solution is extracted with either. The ether extracts are washed with sodium bicarbonate solution and with water and are evaporated to dryness by distillation in a vacuum. The residue of 8.3 g. is a very viscous, almost colorless oil which need not be purified for further reaction. Pure 2-(β-carbomethoxy ethyl)-2-(3,4-dimethoxy phenyl) cyclohexanone has a boiling point of 170–175° C./0.1 mm. Hg.

*Analysis.*—$C_{18}H_{24}O_5$: Molecular weight, 320.4. Calculated: 67.48% C; 7.55% H. Found: 67.12% C; 7.53% H.

(e) 9-(3,4-Dimethoxy Phenyl)-2,3,4,5,6,7-Hexahydroindole 7.8 g. of 2-(β-carbomethoxy ethyl)-2-(3,4-dimethoxy phenyl) cyclohexanone are dissolved in 45 cc. of ethanol and the solution is heated under reflux with 11.7 cc. of 80% hydrazine hydrate for 3 hours. After distilling off the solvent and excess hydrazine hydrate, the remaining vitreous residue of 8.15 g. is dissolved in 135 cc. of 3 N hydrochloric acid. A 20% sodium nitrite solution is added drop by drop at 0° C. to said solution until the potassium iodide-starch paper reaction remains unchanged. About three equivalent amounts of sodium nitrite are required. The resulting azide is extracted with ether. The ethereal extract is washed with sodium bicarbonate solution and water, dried over anhydrous sodium sulfate, and evaporated to dryness by distillation in a vacuum at room temperature. The residue of about 7.0 g. is immediately dissolved in 15 cc. of glacial acetic acid and the solution is slowly heated in a water bath, whereby decomposition of the azide sets in. After heating for one hour on the water bath, 25 cc. of 20% hydrochloric acid are added and the resulting mixture is heated under reflux for one and a half more hours. Thereafter the reaction mixture is evaporated to dryness in a vacuum, the residue is dissolved in water, and the aqueous solution is extracted with ether. The aqueous phase is rendered alkaline by the addition of sodium hydroxide solution and is again exhaustively extracted with ether. The combined ether extracts of the alkaline solution are washed with water, dried over anhydrous sodium sulfate, and evaporated to dryness in a vacuum. The residue of 3.25 g. is purified by fractional distillation. Boiling point: 136–140° C./0.05 mm. Hg.

*(f) 9-(3,4-Dimethoxy Phenyl) Octahydroindole*

A solution of 2.7 g. of 9-(3,4-dimethoxy phenyl)-2,3,4,5,6,7-hexahydroindole in 250 cc. of methanol is acidified by the addition of 2.7 g. of 60% perchloric acid and is hydrogenated at 20° C. with hydrogen under a pressure of 100 atm. gauge in the presence of 0.2 g. of platinum oxide catalyst. Thereafter the catalyst is filtered off, the filtrate is diluted with water, and the alcohol is distilled off in a vacuum. The aqueous solution is rendered alkaline by the addition of ammonia and is extracted with ether. After distilling off the ether, 2.5 g. of a residue which consists of pure 9-(3,4-dimethoxy phenyl) octahydroindole are obtained. Boiling point: 140–141° C./0.05 mm. Hg.

*(g) 1-Methyl-9-(3,4-Dimethoxy Phenyl) Octahydroindole, Formula IV*

2 g. of 9-(3,4-dimethoxy phenyl) octahydroindole are dissolved in 30 cc. of methanol. 2 cc. of a 40% formaldehyde solution are added thereto and the mixture is allowed to stand at room temperature for 30 minutes. Thereafter, hydrogenation is effected in the presence of 0.1 g. of platinum oxide catalyst. After hydrogen absorption has ceased, the catalyst is filtered off and the solvent is distilled in a vacuum. 1.8 g. of 1-methyl-9-(3,4-dimethoxy phenyl) octahydroindole, also designated "mesembrane," are obtained in the form of a colorless oil. Said base is converted into the hydrochloride by means of an ethereal hydrogen chloride solution. The hydrochloride melts at 198° C. on recrystallization from isopropanol.

EXAMPLE 2

A solution of 1 g. of 9-(3,4-dimethoxy phenyl) octahydroindole in 20 cc. of acetone is heated with 2 cc. of methyl iodide under reflux for 3 hours. Thereafter, the solution is evaporated to dryness in a vacuum, the residue is dissolved in 20 cc. of water, and the resulting aqueous solution is rendered alkaline by the addition of ammonia and is extracted by means of ether. After distilling off the ether, 0.8 g. of mesembrane base are obtained.

EXAMPLE 3

5 g. of the alkaloid mesembrine are added to a solution of 10 g. of metallic sodium and 200 cc. of diethylene glycol. 10 cc. of hydrazine hydrate (100%) are added thereto and the mixture is heated under reflux to 120° C. for one hour. The reflux condenser is then removed and the solution is kept at 200° C. for 4 hours. After cooling, the reaction mixture is diluted by the addition of 500 cc. of water and is exhaustively extracted by means of ether. The ethereal extracts are washed with water and are evaporated to dryness by distillation in a vacuum. The residue is dissolved in 100 cc. of benzene and is purified chromatographically by passing through 20 g. of aluminum oxide. After distilling off the solvent, the resulting oily mesembrane base is purified by distillation in a vacuum. Boiling point: 135–138° C./0.05 mm. Hg; optical rotation: $[\alpha]_D^{20} = -15.3° \pm 0.5°$ (concentration: 2% in methanol).

*Analysis.*—$C_{17}H_{25}O_2N$: Molecular weight, 275.38. Calculated: 74.14% C; 9.15% H; 5.08% N. Found: 73.90% C; 9.26% H; 5.17% N.

The hydrochloride of said mesembrane base is produced by dissolving 2 g. of the base in 20 cc. of absolute ether and adding ethereal hydrogen chloride thereto until precipitation is completed. The hydrochloride is filtered off by suction and, after drying, is recrystallized from isopropanol. Melting point: 193° C.; optical rotation: $[\alpha]_D^{23} = -6.3° \pm 0.3°$ (concentration: 2% in methanol).

*Analysis.*—$C_{17}H_{25}O_2N \cdot HCl$: Molecular weight, 311.84. Calculated: 65.47% C; 8.40% H; 4.49% N; 11.37% Cl. Found: 65.42% C; 8.50% H; 4.52% N; 11.31% Cl.

EXAMPLE 4

1 g. of mesembrine are dissolved in 25 cc. of about 20% hydrochloric acid. 5 g. of amalgamated zinc are added thereto and the mixture is heated to boiling for 4 hours. The cooled solution is filtered, rendered alkaline by the addition of ammonia, and repeatedly extracted by means of ether. The ether residue is purified by chromatography as described in Example 3, by passing the benzene solution through 10 g. of aluminum oxide. It is then converted into the hydrochloride which, on recrystallization from isopropanol, melts at 193° C. Yield: 0.5 g.

EXAMPLE 5

5 g. of mesembrine are dissolved in 100 cc. of methanol and are hydrogenated in the presence of 0.2 g. of platinum oxide catalyst. After hydrogen absorption is completed, the catalyst is filtered off and the filtrate is evaporated to dryness in a vacuum. The residue is recrystallized from acetic acid ethyl ester and yields 3.8 g. of mesembrinol of the formula $C_{17}H_{25}O_3N$, and the melting point 146° C.

3.8 g. of said mesembrinol are dissolved in 200 cc. of xylene. 5 g. of phosphorus pentoxide are added thereto and the mixture is heated to 140° C. for 6 hours. 100 cc. of N hydrochloric acid are added thereto. The resulting layers are separated, and the xylene layer is twice extracted with hydrochloric acid, each time with 50 cc. of N hydrochloric acid. The hydrochloric acid solutions are rendered alkaline by the addition of ammonia and are exhaustively extracted by means of ether. The combined ethereal extracts are dried over anhydrous sodium sulfate and are evaporated to dryness in a vacuum. The resulting oily residue consisting of about 2.9 g. of mesembrene of the formula $C_{17}H_{23}O_3N$ are dissolved in 30 cc. of methanol, and are hydrogenated in the presence of 0.2 g. of platinum oxide. After one mole of hydrogen has been absorbed, the catalyst is filtered off and the filtrate is evaporated to dryness in a vacuum. The residue can be converted by means of ethereal hydrochloric acid solution into the hydrochloride of mesembrane of the melting point 193° C. as described in Example 3. Yield: 2.5 g.

EXAMPLE 6

5 g. of mesembrenine of the formula $C_{17}H_{21}O_3N$ and the melting point 88–89° C. are converted by Wolf-Kishner reduction as described in Example 3 into desoxomesembrenine. The resulting base is dissolved in 30 cc. of methanol and is hydrogenated in the presence of 0.2 g. of platinum oxide. After 1 mole of hydrogen has been absorbed, the catalyst is filtered off, the filtrate is evaporated to dryness, and the residue is treated with ethereal hydrochloric acid. In this manner 2 g. of mesembrane hydrochloride of the melting point 198° C., on recrystallization from isopropanol, are obtained.

EXAMPLE 7

1-Methyl-9-Phenyl Octahydroindole 5.5 g. of 9-phenyl octahydroindole of the boiling point 107–108° C./0.15 mm. Hg are dissolved in 180 cc. of methanol. 4.6 cc. of a 40% formaldehyde solution are added thereto. The mixture is allowed to stand for 30 minutes and the resulting solution is then hydrogenated at room temperature and atmospheric pressure in the presence of 0.39 g. of platinum oxide as catalyst. After hydrogen absorption has ceased, the catalyst is filtered off. Water is added to the filtrate and the methanol is distilled off in a vacuum. The resulting 1-methyl-9-phenyl octahydroindole is extracted by means of ether. After evaporating the ether, 5.5 g. of a colorless oil are obtained. Said oil is converted into the hydrochloride by means of ethereal hydrogen chloride. After recrystallization from acetic acid ethyl ester, the hydrochloride melts at 246° C.

*Analysis.*—$C_{15}H_{22}NCl$: Molecular weight, 251.8. Calculated: 71.55% C; 8.81% H; 5.56% N; 14.08% Cl. Found: 71.34% C; 8.78% H; 5.83% N; 13.94% Cl.

EXAMPLE 8

1-Methyl-9-(4-Methoxy Phenyl) Octahydroindole 2 g. of 9-(4-methoxy phenyl) octahydroindole of the boiling point 135° C./0.05 mm. Hg and 2 g. of a 40% formaldehyde solution are reacted and hydrogenated as described in Example 7. On working up the reaction mixture, 1.9 g. of a colorless oil are obtained. The hydrochloride melts at 196° C. on recrystallization from isopropanol.

*Analysis.*—$C_{16}H_{24}NOCl$: Molecular weight, 218.85. Calculated: 68.19% C; 8.58% H; 4.97% N; 12.58% Cl. Found: 67.60% C; 8.21% H; 5.04% N; 12.45% Cl.

EXAMPLE 9

1-Methyl-9-(3,4,5-Trimethoxy Phenyl) Octahydroindole 4.3 g. of 9-(3,4,5-trimethoxy phenyl) octahydroindole and 4.31 g. of a 40% formaldehyde solution are reacted and hydrogenated as described in Example 7. On working up the hydrogenation mixture, 3.95 g. of a colorless oil are obtained. The hydrochloride melts at 177–180° C., on recrystallization from acetic acid ethyl ester.

*Analysis.*—$C_{18}H_{28}O_3NCl$: Molecular weight, 341.9. Calculated: 63.23% C; 8.25% H; 4.10% N; 10.37% Cl. Found: 63.47% C; 8.23% H; 4.17% N; 10.39% Cl.

EXAMPLE 10

1-Methyl-9-(3-Methoxy-4-Ethoxy Phenyl) Octahydroindole 5 g. of 9-(3-methoxy-4-ethoxy phenyl) octahydroindole of the boiling point 157° C./0.05 mm. Hg and 5 g. of a 40% formaldehyde solution are reacted and hydrogenated as described in Example 7. 5 g. of a colorless oil are obtained on working up the reaction mixture. The hydrochloride melts at 160–161° C., on recrystallization from acetic acid ethyl ester.

*Analysis.*—$C_{18}H_{28}O_2NCl$: Molecular weight, 325.9. Calculated: 66.34% C; 8.66% H; 4.30% N. Found: 65.69% C; 8.86% H; 4.40% N.

EXAMPLE 11

0.375 g. of paraformaldehyde and 3 cc. of formic acid are added to 2.75 g. of 9-(3-methoxy-4-ethoxy phenyl) octahydroindole of the boiling point 157° C./0.05 mm. Hg. Vigorous reaction takes place whereby the temperature of the reaction mixture increases and considerable amounts of gas are generated. On heating the mixture on a water bath for half an hour, the reaction is completed. The reaction mixture is then poured into 50 cc. of 2 N sodium hydroxide solution and extracted with ether. After distilling off the ether, 2.87 g. of a colorless oil remain. Said oil is converted into the hydrochloride by means of ethereal hydrogen chloride. The hydrochloride melts at 160° C., on recrystallization from acetic acid ethyl ester, and does not yield a depression in melting point on mixing with the hydrochloride obtained according to Example 10.

EXAMPLE 12

1-Ethyl-9-(3-Methoxy-4-Ethoxy Phenyl) Octahydroindole 3 g. of 9-(3-methoxy-4-ethoxy phenyl) octahydroindole of the boiling point 157° C./0.05 mm. Hg are heated on the water bath with 5 cc. of acetic acid anhydride for 30 minutes. The mixture is then diluted by the addition of 100 cc. of 2 N sodium bicarbonate solution. The reaction product is dissolved in ether. After evaporating the ether, 3.15 g. of a very viscous colorless oil are obtained. Said oil is reduced without further purification to N-ethyl-9-(3-methoxy-4-ethoxy phenyl) octahydroindole by reaction in ethereal solution with an excess of lithium aluminum hydride. After working up the reduction mixture, 3.0 g. of a colorless residue are obtained. The resulting product solidifies on standing and can be recrystallized from n-hexane. Melting point: 64–65° C.

*Analysis.*—$C_{19}H_{29}NO_2$: Molecular weight, 303.5. Calculated: 75.20% C; 9.63% H; 4.62% N. Found: 75.08% C; 9.65% H; 4.66% N.

The hydrochloride of said base melts at 160° C., on recrystallization from acetic acid ethyl ester.

*Analysis.*—$C_{19}H_{30}NO_2Cl$: Molecular weight, 339.9. Calculated: 67.14% C; 8.90% H; 4.12% N. Found: 66.78% C.; 8.84% H; 3.92% N.

EXAMPLE 13

1-Ethyl-9-(3,4-Dimethoxy Phenyl) Octahydroindole 2 g. of 9-(3,4-dimethoxy phenyl) octahydroindole of the boiling point 140–141° C./0.05 mm. Hg are heated on the water bath under reflux in 30 cc. of acetone with 1.6 g. of ethyl iodide for 4 hours. Thereafter, the solution is evaporated to dryness and the residue is dissolved in water. The resulting solution is rendered alkaline by the addition of ammonia and is extracted with ether. After distilling off the ether, an oily residue of 1.9 g. remains. This base is converted into the hydrochloride which, on recrystallization from a mixture of acetone and acetic acid ethyl ester, melts at 189–190° C.

*Analysis.*—$C_{18}H_{28}O_2NCl$: Molecular weight, 325.87. Calculated: 66.34% C; 8.66% H; 4.29% N. Found: 65.94% C; 8.63% H; 4.36% N.

EXAMPLE 14

1-Benzyl-9-(3,4-Dimethoxy Phenyl) Octahydroindole 2 g. of 9-(3,4-dimethoxy phenyl) octahydroindole of the boiling point 140–141° C./0.05 mm. Hg are heated under reflux on a water bath in 30 cc. of acetone with 0.85 g. of benzyl chloride for 4 hours. Thereafter, the solution is evaporated to dryness. The residue is dissolved in water and the solution is rendered acid by the addition of hydrochloric acid, extracted with ether, then rendered alkaline by the addition of ammonia, and again extracted with ether. After distilling off the ether from the extraction of the ammoniacal solution, an oily residue of about 2.1 g. remains. The hydrochloride prepared from said base and recrystallized from a mixture of isopropanol and acetic acid ethyl ester melts at 159–160° C.

*Analysis.*—$C_{23}H_{30}NO_2Cl$: Molecular weight, 387.93.

Calculated: 71.20% C; 7.80% H; 3.61% N. Found: 70.78% C; 7.76% H; 4.05% N.

EXAMPLE 15

1-Methyl-9-(4-Chloro Phenyl) Octahydroindole 3 g. of a 40% formaldehyde solution are added to 3.0 g. of 9-(4-chloro phenyl) octahydroindole of the boiling point 121–122° C./0.15 mm. Hg. The reaction mixture is hydrogenated in the presence of platinum oxide catalyst as described in Example 7. On working up the reaction mixture, about 2.8 g. of an oily base are obtained. Its hydrochloride melts at 205° C., on recrystallization from isopropanol.

Analysis.—$C_{15}H_{21}NCl_2$: Molecular weight, 286.24. Calculated: 62.94% C; 7.39% H; 4.89% N. Found: 62.87% C; 7.13% H; 4.78% N.

EXAMPLE 16

1-Methyl-9-(4-Methoxy Phenyl) Octahydroindole 3.6 g. of 9-(4-methoxy phenyl)-2,3,4,5,6,7-hexahydroindole of the boiling point 140° C./0.2 mm. Hg are dissolved 50 cc. of absolute acetone and are heated under reflux with 5 cc. of methyliodide on a steam bath for 3 hours. Thereafter, the acetone and excess methyliodide are removed by distillation in a vacuum. 5.53 g. of 1-methyl-9-(4-methoxy phenyl)-1,2,3,4,5,6-hexahydroindole hydroiodide remain. Said compound is hydrogenated, without further purification, in 60 cc. of methanol at room temperature and atmospheric pressure in the presence of platinum oxide. After hydrogen absorption is completed, the catalyst is filtered off and the solution is evaporated to dryness. The residue is dissolved in water, rendered alkaline by the addition of ammonia, and extracted with ether. The ethereal extract yields 3.4 g. of a residue consisting of two isomeric 1-methyl-9-(4-methoxy phenyl) octahydroindole bases.

In order to resolve the mixture of the two isomeric bases, they are converted into a mixture of their hydrochlorides. By recrystallization of the hydrochloride mixture from isopropanol, 1.57 g. of the hydrochloride of the normal 1-methyl-9-(4-methoxy phenyl) octahydroindole of the melting point 196° C. are obtained.

Analysis.—$C_{16}H_{24}NOCl$: Molecular weight, 281.9. Calculated: 68.19% C; 8.58% H; 4.97% N; 12.58% Cl. Found: 67.80% C; 8.21% H; 5.04% N; 12.45% Cl.

The iso-1-methyl-9-(4-methoxy phenyl) octahydroindole is isolated after rendering the mother liquor from the normal hydrochloride alkaline, extracting the base with ether, evaporating the ether extract, dissolving the residue in benzene containing 1% of methanol, and passing the benzene solution through a chromatographic column of 30 g. of silicagel. The resulting iso-compound is converted into its hydrochloride which melts at 198° C., on recrystallization from a mixture of isopropanol and acetic acid ethyl ester.

Analysis.—$C_{16}H_{24}NOCl$: Molecular weight, 281.9. Calculated: 68.19% C; 8.58% H; 4.97% N; 12.58% Cl. Found: 67.97% C; 8.79% H; 5.19% N; 12.48% Cl.

Figure 2:
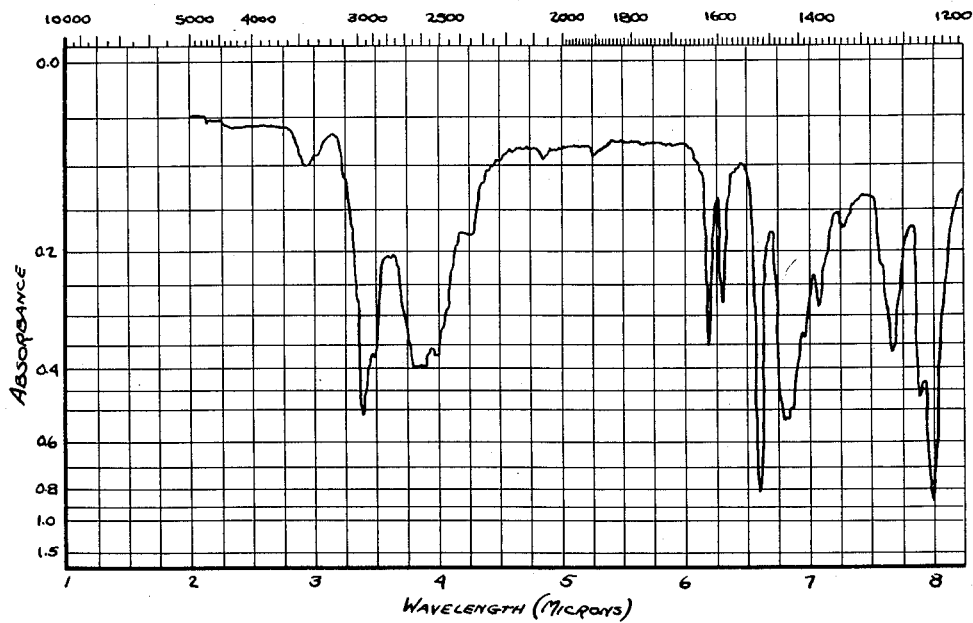
Figure 2:
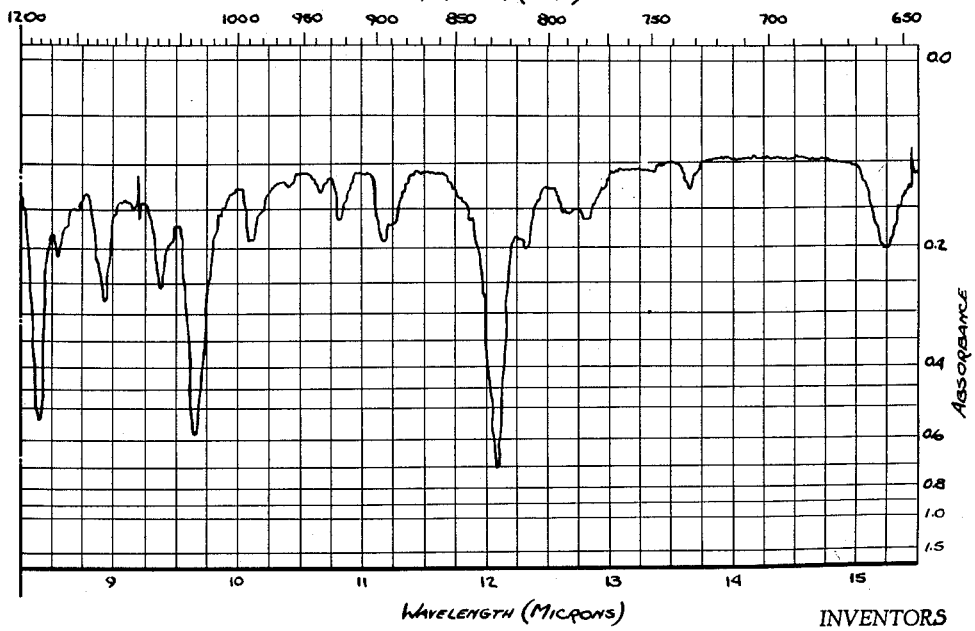

The melting point of a mixture of both isomeric hydrochlorides shows a marked depression. Their infrared spectra are also different. See the attached drawings wherein FIG. 1 illustrates the infrared spectrum of the normal hydrochloride and FIG. 2 that of the iso-compound.

EXAMPLE 17

1-Methyl-9-(3,4-Dimethoxy Phenyl) Octahydroindole 4 cc. of methyliodide are added to a solution of 3.15 g. of 9-(3,4-dimethoxy phenyl)-2,3,4,5,6,7-hexahydroindole of the boiling point 136–140° C./0.05 mm. Hg. in 50 cc. of acetone. The mixture is heated under reflux for three hours. After distilling off the solvent, 5.2 g. of 1-methyl-9-(3,4-dimethoxy phenyl)-1,2,3,4,5,6-hexahydroindole hydroiodide are obtained. The salt is dissolved in 50 cc. of methanol. 0.2 g. of platinum oxide catalyst are added and the mixture is hydrogenated. After hydrogenation is completed, the catalyst is filtered off and the filtrate is evaporated to dryness in a vacuum. The residue is dissolved in a small amount of water. The aqueous solution is rendered alkaline by the addition of ammonia and is then extracted with ether. After distilling off the ether, 2.98 g. of residue are obtained. It contains, in addition to the normal 1-methyl-9-(3,4-dimethoxy phenyl) octahydroindole, the corresponding iso-compound. The hydrochloride of the normal compound melts at 198° C., the hydrochloride of the iso-compound at 240° C. The two isomers are separated by chromatographic treatment by passing a benzene solution through a column of silicagel or by fractional crystallization of the hydrochlorides from isopropanol as described in Example 16.

EXAMPLE 18

A solution of 2.0 g. of 9-(3,4-dimethoxy phenyl)-2,3,4,5,6,7-hexahydroindole in 30 cc. of ether are added drop by drop to a solution of 600 mg. of lithium aluminum hydride in 50 cc. of absolute ether, while stirring. The mixture is then heated under reflux for 6 hours. Thereafter, excess lithium aluminum hydride is decomposed by the addition of 30% sodium hydroxide solution and the reaction product is extracted with ether. The residue of 1.7 g., obtained on evaporation of the ether, consists of 9-(3,4-dimethoxy phenyl) octahydroindole and its isomer iso-9-(3,4-dimethoxy phenyl) octahydroindole. Without separation and purification, said residue is dissolved in acetone and is methylated by the addition of an excess of methyliodide. The bases obtained thereby are converted into their hydrochlorides and are resolved by fractional crystallization from isopropanol. The normal 1-methyl-9-(3,4-dimethoxy phenyl) octahydroindole hydrochloride of the melting point 198° C. and the corresponding iso-compound of the melting point 248° C. are obtained thereby.

EXAMPLE 19

1.3 g. of DL-1-methyl-9-(3,4-dimethoxy phenyl) octahydroindole hydrochloride of the melting point 198° C. are dissolved in 20 cc. of methanol and are reacted with the equivalent amount of the silver salt of α-bromo-(D-camphor)-π-sulfonic acid. The precipitated silver chloride is filtered off and the filtrate is evaporated to dryness. The oily residue is dissolved in a small amount of isopropanol. After standing for some time the α-bromo-(D-camphor)-π-sulfonic acid salt of the L-1-methyl-9-(3,4-dimethoxy phenyl) octahydroindole crystallizes. On recrystallization from a small amount of isopropanol, the resulting salt has a melting point of 168° C.

Analysis. — $C_{17}H_{25}O_2N \cdot C_{10}H_{15}OBrSO_3H$: Molecular weight, 586.57. Calculated: 55.28% C; 6.87% H; 2.39% N. Found: 55.17% C; 6.77% H; 2.50% N. Optical rotation: $[\alpha]_D^{22} = +48.4° \pm 0.5°$ (concentration: 2% in methanol).

1.1 g. of the resulting crystalline product are dissolved in 20 cc. of water and the solution is rendered alkaline by the addition of ammonia. It is then extracted with ether. The oily base obtained on distilling off the ether, is converted into the hydrochloride, and is recrystallized from isopropanol. Melting point: 193° C.; optical rotation $[\alpha]_D^{20} = -8° \pm 0.5°$ (concentration: 2% in methanol).

Analysis.—$C_{17}H_{25}O_2N \cdot HCl$: Molecular weight, 311.84. Calculated: 65.47% C; 8.40% H; 4.49% N; 11.37% Cl. Found: 65.42% C; 8.50% H; 4.52% N; 11.31% Cl.

The hydrochloride of the corresponding dextrorotary isomer is obtained by rendering the mother liquor alkaline and converting the resulting base into the hydrochloride. It is obtained in pure form after repeated recrystallization from isopropanol.

EXAMPLE 20

1-Methyl-9-(4-Methyl Phenyl) Octahydroindole 5 g. of 9-(4-methyl phenyl) octahydroindole of the boiling point 107–113° C./0.07 mm. Hg are dissolved in 150 cc. of methanol. 5 cc. of a 40% formaldehyde solution are added thereto. The mixture is allowed to stand for about 30 minutes and is then hydrogenated at room temperature and atmospheric pressure in the presence of 0.2 g. of platinum oxide. After hydrogen absorption has been completed, the catalyst is filtered off and the filtrate is diluted with water. The methanol is distilled off and the aqueous solution is extracted with ether. After evaporating the ether, about 5 g. of 1-methyl-9-(4-methyl phenyl) octahydroindole are obtained in the form of a colorless oil which can be converted into the hydrochloride by means of ethereal hydrogen chloride. The hydrochloride melts at 238° C., on recrystallization from acetic acid ethyl ester. The yield is 4.7 g.

Analysis.—$C_{16}H_{23}N \cdot HCl$: Molecular weight, 265.84. Calculated: 72.29% C; 9.10% H; 5.27% N; 13.34% Cl. Found: 72.04% C; 8.90% H; 5.25% N; 13.41% Cl.

EXAMPLE 21

1-Ethyl-9-(p-Hydroxy Phenyl) Octahydroindole 3 g. of 9-(p-hydroxy phenyl)-2,3,4,5,6,7-hexahydroindole of the melting point 246° C. are dissolved in 200 cc. of methanol. The solution is hydrogenated after the addition of 3 cc. of perchloric acid and of 0.2 g. of platinum as catalyst. Thereafter, the catalyst is filtered off and the methanol is distilled off. The resulting residue is dissolved in 30 cc. of water. The aqueous solution is rendered alkaline by the addition of sodium bicarbonate solution and is extracted by means of methylene chloride. The 9-(p-hydroxy phenyl) octahydroindole obtained after distilling off the methylene chloride, is dissolved in 20 cc. of acetic acid anhydride and the solution is heated on the steam bath after the addition of 2 cc. of pyridine for 30 minutes. The reaction mixture is poured into ice water and is extracted with methylene chloride. The methylene chloride extracts are washed with sodium bicarbonate solution and water and are then evaporated to dryness. The resulting oily acetyl compound is dissolved in 20 cc. of absolute ether and the solution is added to a suspension of 0.6 g. of lithium aluminum hydride in 100 cc. of absolute ether. The reaction mixture is allowed to stand overnight and is then decomposed by the addition of water. The ethereal phase is dried over anhydrous sodium sulfate and is evaporated to dryness in a vacuum. In this manner about 1 g. of 1-ethyl-9-(p-hydroxy phenyl) octahydroindole of the melting point 158–159° C., on recrystallization from acetic acid ethyl ester, are obtained.

Analysis.—$C_{16}H_{23}NO$: Molecular weight; 245.35. Calculated: 78.32% C; 9.45% H; 5.71% N. Found: 78.52% C; 9.23% H; 5.63% N.

The starting materials used in the preparation of the octahydroindole compounds of the preceding examples are prepared in an analogous manner as described in Examples 1(a) to 1(f).

In place of the 9-(substituted phenyl) octahydroindole compounds and 9-(substituted phenyl)-2,3,4,5,6,7-hexahydroindole compounds used in the preceding examples as reactants, there can be employed other substituted phenyl hexahydroindole and octahydroindole compounds, for instance, compounds, having in 9-position a phenyl radical which carries other lower alkyl radicals than the methyl radical, such as the ethyl radical, the isopropyl radical and the like radicals, or other lower alkoxy groups than the methoxy and ethoxy groups, such as the propyloxy group and the like groups, or other halogen atoms than the chlorine atom, such as the bromine atom and the like.

In place of the methyl, ethyl, and benzyl radicals in 1-position of the 9-phenyl-2,3,4,5,6,7-hexahydroindole compounds and of the 9-phenyl octahydroindole compounds, there can be present other lower alkyl substituents such as the propyl, isopropyl, n-butyl, isobutyl, and the like radicals.

As stated above, the new compounds according to the present invention are ataractic agents of high activity. Pharmacological and clinical tests have shown that the new compounds, and especially mesembrane, i.e. 1-methyl-9-(3,4-dimethoxy phenyl) octahydroindole, exert a pronounced phychotropic effect. In healthy persons, oral administration of mesembrane causes stimulation accompanied by a pronounced diminishing effect upon the emotional or affective tone of the person's feeling life. Thus the compound has a noteworthy stabilizing effect upon the mood and disposition of the persons. The general excitability of the test person and his specific irritability with respect to external stimuli, such as sensory irritation, tension due to expectation, and stress in general, is markedly reduced under the influence of mesembrane. The sensitivity to paincausing stimulants is also considerably reduced. The preferred ataractic agent according to the present invention is mesembrane. Other compounds of this series have a similar, although less pronounced activity.

The compounds are preferably employed in the form of their hydrochlorides. However, other acid addition salts may also be prepared and used, such as the addition salts with inorganic acids, for instance, hydrobromic acid, sulfuric acid, phosphoric acid, or with organic acids, for instance, citric acid, tartaric acid, malic acid, maleic acid, succinic acid salicylic acid, benzoic acid, phthalic acid, nicotinic acid, and other acids which are well tolerated and are non-toxic in the doses administered. These acid addition salts are prepared in a similar manner as described hereinabove for the hydrochlorides. Other methods of making such acid addition salts as they are known to those skilled in the art, may, of course, also be used.

The new compounds are preferably administered orally in solid form such as in the form of tablets, pills, dragees, lozenges, and the like shaped preparations, or in powder form, preferably enclosed in gelatin and the like capsules. Administration in liquid form, such as in the form of solutions, emulsions, suspensions, sirups, and the like is also possible. These solid and liquid preparations are produced in a manner known to the art of compounding and processing pharmaceutical products, whereby the conventional diluting agents, binding agents, lubricants, expanding agents, and the like may be employed.

Of course, many changes and variations in the starting materials and reactants used, in the reaction conditions, temperature, pressure, duration employed, in the solvents and catalysts added, in the methods of isolating and purifying the reaction products and of resolving their racemic mixtures, and the like may be made by those skilled in the art in accordance with the principles set forth herein and in the claims annexed thereto.

We claim:
1. 1-methyl-9-(3,4-dimethoxy phenyl) octahydroindole.
2. The hydrochloride of 1-methyl-9-(3,4-dimethoxy phenyl) octahydroindole.
3. 1-methyl-9-(3-methoxy-4-ethoxy phenyl) octahydroindole.
4. 1-ethyl-9-(3,4-dimethoxy phenyl) octahydroindole.
5. 1-ethyl-9-(4-hydroxy phenyl) octahydroindole.

References Cited in the file of this patent

Boekelheide: J. Am. Chem. Soc., vol. 69, pages 790–92 (1947).
Richter's Organic Chemistry, vol. IV, pages 4–5 (1947).
Derwent Patents, Commonwealth Report, vol. 164 (Australian), Group 3A, page 1, Dec. 4, 1959.

UNITED STATES PATENT OFFICE
CERTIFICATE OF CORRECTION

Patent No. 3,028,394　　　　　　　　　　　　　April 3, 1962

Alfred Popelak et al.

It is hereby certified that error appears in the above numbered patent requiring correction and that the said Letters Patent should read as corrected below.

Column 2, line 36, for "and", second occurrence, read -- the --; column 4, line 61, for "either" read -- ether --; column 12, line 10, for "compuonds" read -- compounds --.

Signed and sealed this 10th day of July 1962.

(SEAL)
Attest:

ERNEST W. SWIDER　　　　　　　　　　　　DAVID L. LADD
Attesting Officer　　　　　　　　　　　　　Commissioner of Patents